W. R. McKEEN, Jr.
MOTOR TRUCK CONSTRUCTION.
APPLICATION FILED MAY 26, 1906.

980,546.

Patented Jan. 3, 1911.

4 SHEETS—SHEET 1.

UNITED STATES PATENT OFFICE.

WILLIAM R. McKEEN, JR., OF OMAHA, NEBRASKA, ASSIGNOR, BY MESNE ASSIGNMENTS, TO McKEEN MOTOR CAR COMPANY, OF OMAHA, NEBRASKA, A CORPORATION OF NEW JERSEY.

MOTOR-TRUCK CONSTRUCTION.

980,546.  Specification of Letters Patent.  Patented Jan. 3, 1911.

Application filed May 26, 1906.  Serial No. 318,824.

*To all whom it may concern:*

Be it known that I, WILLIAM R. McKEEN, Jr., residing at Omaha, in the county of Douglas and State of Nebraska, have invented certain new and useful Improvements in Motor-Truck Construction, of which the following is a full, clear, and exact description, such as will enable others skilled in the art to which it appertains to make and use the same.

This invention relates to motor trucks and parts pertaining thereto.

One of the objects thereof is to provide a light, practical motor truck, in which certain elements are adapted to perform efficiently an increased number of functions with reference to their action as generally used.

Another object is to provide a simple and compact mounting for a source of power in which the parts coact in forming a construction of a minimum of weight and a low cost.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
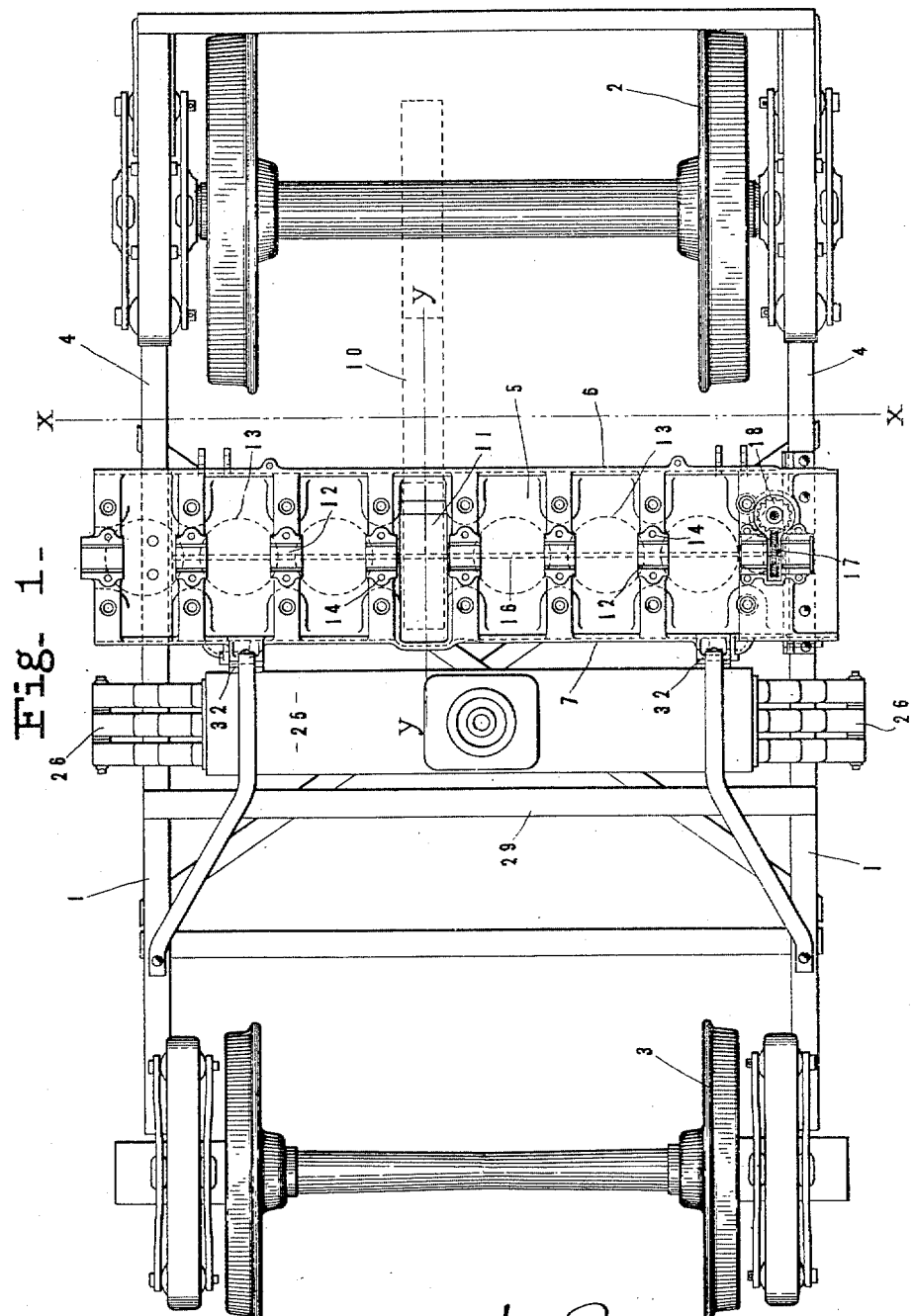
Figure 2:
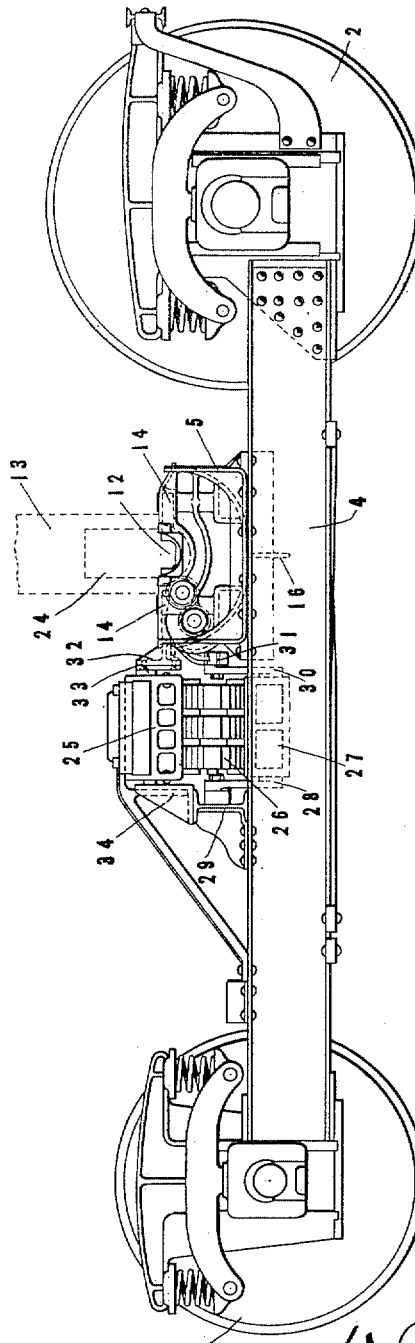
Figure 3:
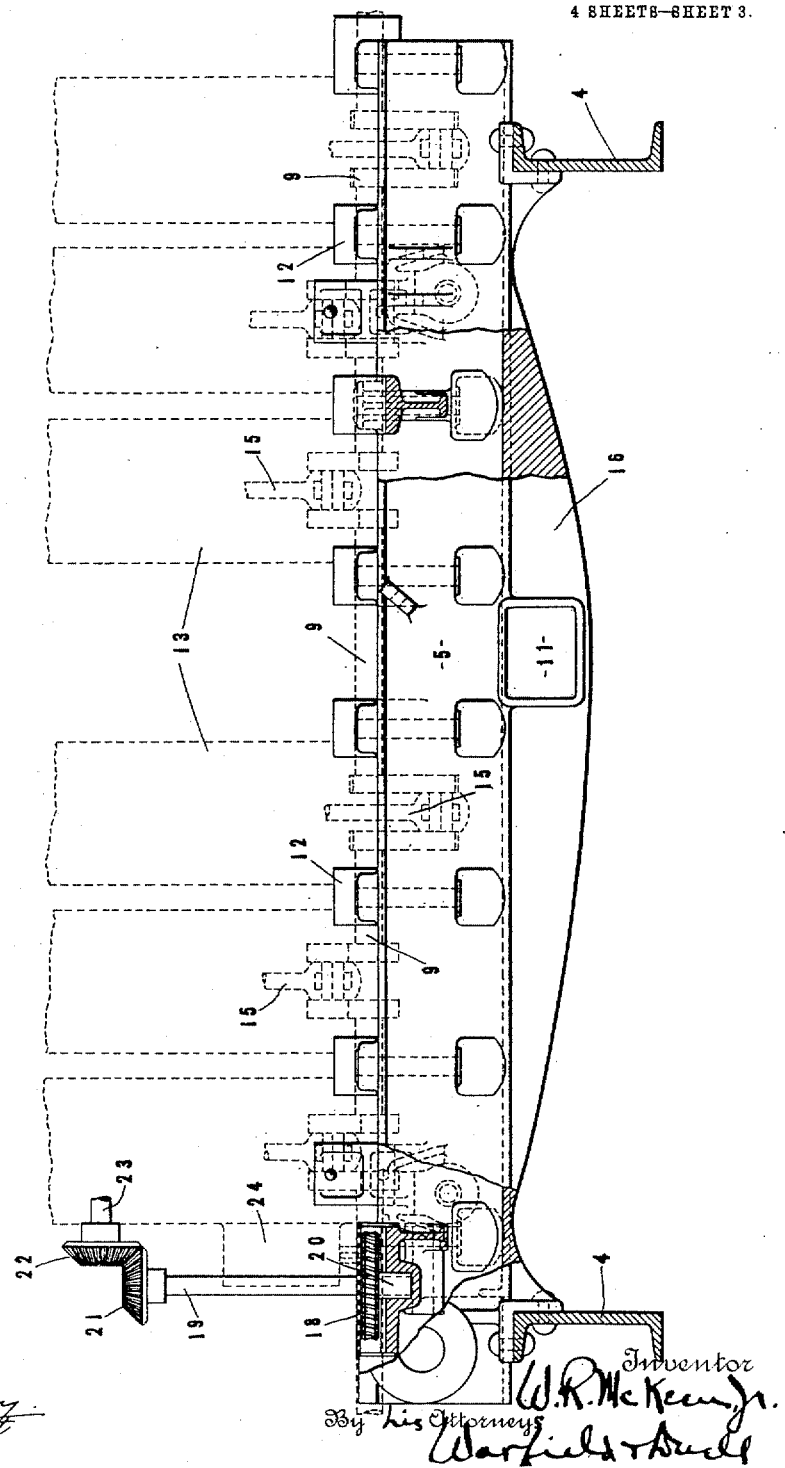
Figure 4:
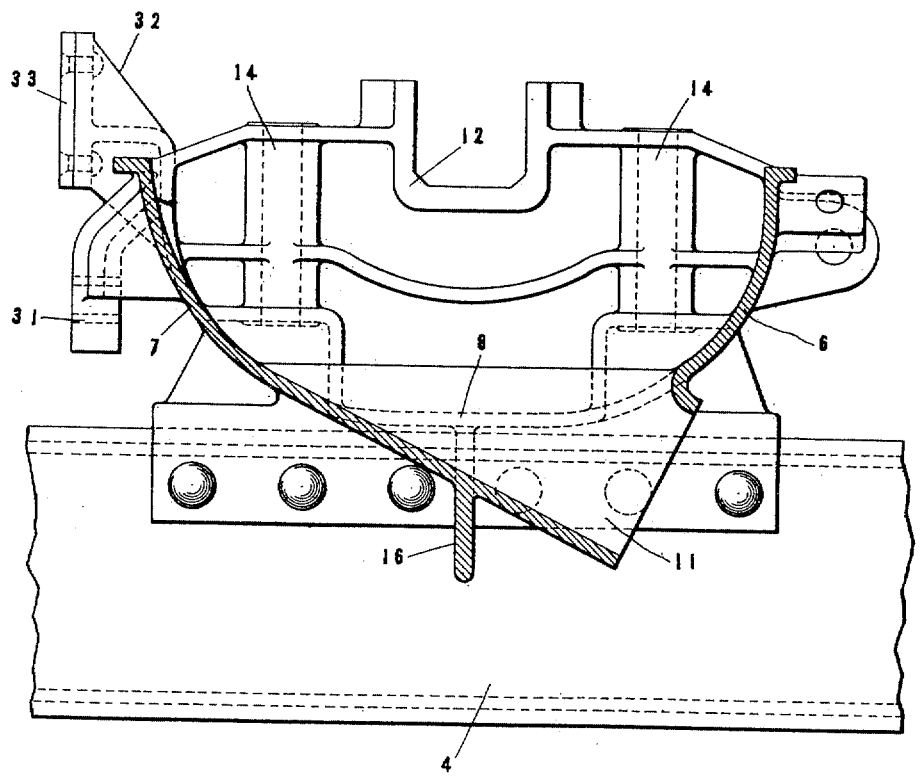

In the accompanying drawings, wherein is shown one of the various possible embodiments of my invention, Figure 1 is a plan of the same; Fig. 2 is a side elevation thereof; Fig. 3 is a sectional elevation taken substantially on the line $x$—$x$ of Fig. 1, and having certain parts broken away in order to show the construction more clearly; Fig. 4 is a sectional elevation taken on the line $y$—$y$ of Fig. 1, and showing the parts on a larger scale.

Similar reference characters refer to similar parts throughout the several views of the drawings.

Preliminary to a detailed description of the embodiment of my invention herein set forth, and in order to render the same more readily grasped, it may here be noted that in motor trucks it is essential that, on account of the somewhat complex conditions of use, elements must be provided for the performance of a large number of functions, and these elements are, in general, on account of the severe stresses inherent to their use, of strong, stiff and somewhat heavy construction. It will thus be seen that there is a tendency in the manufacture of trucks having the desired strength and reliability in action and the requisite easy riding qualities to provide a construction of considerable weight and complexity, where simplicity and lightness are factors of prime importance. This invention proposes, by a combination of several elements and special adaptation of the same one for another, to increase the number of functions which each is able efficiently to perform, and to do away with the necessity for a large number of more or less unrelated parts.

Referring now to Fig. 1 of the accompanying drawings, there is shown a truck-frame 1, mounted upon sets of wheels 2 and 3, through the former of which the power, in this embodiment of my invention, is transmitted. Mounted upon the side bars 4 of the truck-frame 1 is what may be termed a bed 5 which comprises some of the more prominent features of my invention. This bed is in general of an upwardly concave type, having the lateral portions 6 and 7 connected by a transverse lower portion 8, as indicated in Fig. 4 of the drawings. A crank-shaft 9, from which the wheels 2 are driven as by a sprocket-chain 10 passing through the opening or chute 11 in the lower portion of the bed and shown in dotted lines in Fig. 1, is mounted upon the bed 5 as at the portions 12, which form, in effect, transverse walls extending across the same. Between these walls are mounted the cylinders 13 of an engine, the same being indicated in dotted lines in the drawing and being bound to the bed by any suitable means extending through the openings 14 in walls 12. The ends of the bed rest upon the side bars 4, as best shown in Fig. 4 of the drawings, and extend downwardly upon the inner surface thereof, thus serving not only as a transverse brace to the frame, but adapting it better to resist stresses in a diagonal direction and adding materially to its general stiffness. It will thus be seen that the cranks 15 of the engine are each housed in suitable compartments formed by the outer walls or shell of the bed and are thus not only protected against dust rising from the roadbed, but are provided with a suitable oil cellar. The engine, moreover, is rigidly supported, inasmuch as the bed is of flanged construction and is provided with a lower web or flange 16 to stiffen it in a longitudinal direction.

As best shown in Fig. 1 of the drawings, the shaft 9 is provided with a spiral gear 17 intermeshing with a gear 18 upon a vertical shaft 19, journaled within a portion of the bed as shown at 20. The upper portion of shaft 19 is provided with a bevel pinion 21 intermeshing with a similar member 22 upon a transverse shaft 23, from which the valve gears of the engine are preferably driven, the details of this construction not being herein shown as they form in themselves no part of the present invention. An air-compressor 24 is also driven from the shaft 9, the same being mounted upon bed 5 and actuated through an eccentric or other desired means, this apparatus preferably serving to store fluid for braking purposes or for starting the engine if it be of the internal explosion type, or for other desired purposes.

Recurring now to the construction of other features of the truck, the truck bolster 25 is mounted upon elliptic springs 26 which rest in turn upon a spring-plank 27, swung upon one side by the hangers 28 from a transom 29 and upon the side toward the engine-bed by the hangers 30 from the side wall of the bed, as shown at 31. The engine-bed thus serves as one of the transoms of the truck and is also provided with brackets 32 upon which are mounted chafe-plates 33 adapted to co-act with similar members 34 upon the transom 29 in guiding the truck bolster in its vertical movement. Suitable braces are provided extending from the bracket 32 to bracket 34 and thence to the adjacent side bar 4, and diagonal braces are stretched across the lower portions of the frame of the truck, this bracing not being set forth in detail inasmuch as it forms in itself no feature of the present invention.

The operation of the above-described embodiment of my invention is substantially as follows: The load upon the truck is transmitted through the truck bolster, thence through the spring-plank and hangers to the transom 29 and the engine-bed 5, from which points it passes directly to the frame of the truck. The full resiliency of the springs is thus utilized and yet the load is transmitted to the truck frame with a minimum number of parts with the advantages above noted. The frame itself is braced by the engine-bed as above set forth, thus doing away with the necessity for the separate braces which would otherwise be required to bring it up to the desired degree of stiffness, and these functions of the engine-bed and parts auxiliary thereto, among which are the bracing and stiffening of the truck, the support of the spring-plank and the guiding of the bolster, are accomplished without diminution of its general efficiency for the purposes for which it is primarily designed. As a support for the source of power of the truck it not only provides a firm base for the several units thereof and transmits all vibration and stress directly to the main frame of the truck, but provides the crank shaft with the desired number of bearings, furnishes oil cellars for the several cranks and protects the parts against dust or other foreign matter. The power is transmitted to the axle, moreover, in a simple and efficient manner by means of the sprocket-chain as above set forth. Additional functions of the engine-bed are the mounting afforded to the driving mechanism for the valve gears and the air-compressor.

It will thus be seen that I have provided apparatus well adapted to accomplish the several objects of my invention and that the same is of the simplest and most inexpensive construction.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein-described and all statements of the scope of the invention, which, as a matter of language, might be said to fall therebetween.

Having described my invention, what I claim as new, and desire to secure by Letters Patent, is:—

1. In truck construction, in combination, a pair of side bars, means interposed between the same and secured thereto comprising a pair of upwardly-extending portions and a portion connecting the lower portion of the same, an engine mounted upon said means, and bearings upon said means between said upwardly extending portions and having journaled therein the crank shaft of said engine, and means adapted to drive the truck from said engine.

2. In construction of the class described, in combination, a pair of members, means comprising a pair of substantially parallel portions stretched between said members, a shaft mounted upon said first-mentioned means, an engine secured to said first-mentioned means and connected with said shaft, and a portion stretched between said portions and adapted to serve as an oil cellar for said engine.

3. In construction of the class described, in combination, a pair of members, means comprising a pair of substantially parallel portions stretched between said members, an engine secured to said first-mentioned means, and a portion stretched between said portions and adapted to serve as an oil cellar for said engine.

4. In construction of the class described, in combination, a pair of members, means comprising an upwardly concave shell stretched between said pair of members and adapted to brace the same, a crank shaft mounted upon said shell, and an engine mounted upon said shell and connected with said crank shaft, said shell being adapted to serve as an oil cellar for said engine.

5. In construction of the class described, in combination, a pair of truck side bars, means comprising an upwardly concave shell stretched between said pair of side bars and adapted to brace the same, a crank shaft mounted upon said shell, and an engine mounted upon said shell and connected with said crank shaft, said shell being adapted to serve as a dust guard for said shaft and being curved about the same.

6. In truck construction, in combination, a pair of truck side bars, a rigid casting fitted between and secured to said side bars, an engine mounted upon said casting, and means driven from said engine adapted to drive the truck, said casting comprising an upwardly concave shell over which the engine is mounted.

7. In truck construction, in combination, a pair of truck side bars, a rigid casting fitted between and secured to said side bars, an engine mounted upon said casting, and means driven from said engine adapted to drive the truck, said casting comprising an upwardly concave shell and a plurality of transverse members dividing said shell into portions corresponding to and situated below each of the cylinders of the engine.

8. In truck construction, in combination, a pair of side bars, a bolster, springs upon which said bolster is mounted, a spring plank upon which said springs are mounted, hanger links, means mounted upon said side bars from which said hanger links are supported, an engine mounted upon said means, and means driven from said engine and adapted to propel the truck.

9. In truck construction, in combination, a pair of side bars, a bolster, springs upon which said bolster is mounted, a spring plank upon which said springs are mounted, a transom mounted upon said side bars upon one side of said bolster, rigid means mounted upon said side bars upon the other side of said bolster, hanger links supporting said spring plank from said transom and from said rigid means respectively, an engine mounted upon said means, and means driven from said engine adapted to propel said truck.

10. In truck construction, in combination, a pair of side bars, an engine, and means stretched between said side bars and bracing the same, upon which said engine is mounted, said means being adapted to co-act with said engine and form an oil cellar for the same.

11. In truck construction, in combination, a pair of side bars, a crank shaft, an engine connected with said crank shaft, means stretched beneath said engine and connected with and bracing said side bars, substantially inclosing said crank shaft and adapted to serve as a dust guard for the same and bearings upon said means having journaled therein the crank shaft of said engine.

12. In truck construction, in combination, a pair of side bars, a casting fitted between and bracing said side bars, said casting extending along the inner side of each of said side bars and comprising a pair of substantially parallel and relatively spaced, lateral portions, a spring plank, and means supporting one side of said spring plank from one of said portions of said casting.

13. In truck construction, in combination, a pair of side bars, a casting fitted between and bracing said side bars and comprising an upwardly concave shell, a transom stretched between said side bars, and a spring plank supported from said transom and from said casting.

14. In truck construction, in combination, a pair of side bars, a casting fitted between and bracing said side bars and comprising an upwardly concave shell, a transom stretched between said side bars, a spring plank supported from said transom and from said casting, and a stiffening rib formed upon the lower side of said casting and extending transversely of the truck.

15. In truck construction, in combination, a pair of side bars, a casting fitted between and bracing said side bars and comprising an upwardly concave shell, a transom stretched between said side bars, a spring plank supported from said transom and from said casting, an engine mounted upon said casting, and means connected with said engine adapted to propel the truck.

16. In truck construction, in combination, a pair of side bars, a casting fitted between and bracing said side bars and comprising an upwardly concave shell, a transom stretched between said side bars, a spring plank supported from said transom and from said casting, a crank shaft, means within said shell upon which said crank shaft is journaled, an engine mounted upon said casting, and means connected with said shaft and adapted to propel the truck.

17. In truck construction, in combination, a pair of side bars, a casting fitted between and bracing said side bars and comprising an upwardly concave shell, a transom stretched between said side bars, a spring plank supported from said transom and from said casting, a crank shaft, means within said shell upon which said crank shaft is journaled, an engine mounted upon said casting, and means connected with said engine and adapted to propel the truck, said shell partially inclosing and adapted to serve as a dust guard for said crank shaft.

18. In truck construction, in combination, a pair of side bars, an upwardly concave member stretched between said side bars and secured thereto, a crank shaft mounted upon said member, and an engine mounted upon said member and connected with said crank shaft, said upwardly concave member being adapted to serve as an oil cellar for said crank shaft.

19. In truck construction, in combination, a pair of side bars, an upwardly concave member stretched between said side bars and secured thereto, a crank shaft mounted upon said member, an engine mounted upon said member and connected with said crank shaft, and means extending transversely of said upwardly concave member dividing the same into compartments corresponding to each of the cylinders of said engine, said means being adapted in connection with said member to substantially inclose and protect each of the cranks of said crank shaft.

20. In truck construction, in combination, a pair of side bars, a casting fitted between and bracing said side bars and comprising an upwardly concave shell, a crank shaft mounted upon said shell, an engine mounted upon said shell and connected with said crank shaft, and means connected with said crank shaft and adapted to propel the truck.

21. In truck construction, in combination, a pair of side bars, a casting fitted between and bracing said side bars and comprising an upwardly concave shell, a crank shaft mounted upon said shell, an engine mounted upon said shell and connected with said crank shaft, means connected with said crank shaft and adapted to propel the truck, and a rib formed upon said shell beneath the same and extending transversely of the truck.

22. In truck construction, in combination, a pair of side bars, a casting fitted between and bracing said side bars and comprising an upwardly concave shell, a crank shaft mounted upon said shell, said shell being adapted to co-act with said crank shaft and serve as a dust guard therefor, an engine mounted upon said casting and connected with said crank shaft, said shell being provided with an opening, and a sprocket chain passing through said opening and connected with said crank shaft and one of the axles of the truck and adapted to transmit power from one to the other thereof.

23. In truck construction, in combination, a pair of side bars, a casting fitted between and bracing said side bars and comprising an upwardly concave shell, a crank shaft mounted upon said shell, said shell being adapted to co-act with said crank shaft and serve as a dust guard therefor, an engine mounted upon said casting and connected with said crank shaft, said shell being provided with an opening, a sprocket chain passing through said opening and connected with said crank shaft and one of the axles of the truck and adapted to transmit power from one to the other thereof, and means extending transversely of said shell at each side of said opening.

24. In truck construction, in combination, a pair of side bars, a casting fitted between and bracing said side bars and comprising an upwardly concave shell, a crank shaft mounted upon said shell, said shell being adapted to co-act with said crank shaft and serve as a dust guard therefor, an engine mounted upon said casting and connected with said crank shaft, said shell being provided with an opening, a sprocket chain passing through said opening and connected with said crank shaft and one of the axles of the truck and adapted to transmit power from one to the other thereof, and a plurality of means upon which said crank shaft is journaled extending transversely of said shell and dividing the same into a number of compartments corresponding with the cranks of said crank shaft.

25. In construction of the class described, in combination, a pair of truck side bars, a casting stretched between and bracing said side bars and comprising an upwardly concave shell, a crank shaft mounted upon said shell, an engine mounted upon said casting and connected with said crank shaft, said shell being provided with an opening, and power transmitting means connecting with said crank shaft passing through said opening.

26. In construction of the class described, in combination, a pair of truck side bars, a casting stretched between and bracing said side bars and comprising an upwardly concave shell, a crank shaft mounted upon said shell, an engine mounted upon said casting and connected with said crank shaft, said shell being provided with an opening, power transmitting means connected with said crank shaft passing through said opening, and means stretched across said shell at each side of said opening.

27. In construction of the class described, in combination, a pair of side bars, a casting stretched between and bracing said side bars, a crank shaft mounted upon said casting, an internal explosion engine mounted upon said casting and connected with said crank shaft, a shaft connected with the valve gearing of said engine, a substantially vertical shaft mounted upon said casting, power transmitting means connecting said last-mentioned shaft with said crank shaft, and power transmitting means connecting the same with said valve gearing shaft.

28. In construction of the class described, in combination, a pair of side bars, a casting stretched between and bracing said side bars, a crank shaft mounted upon said casting, an internal explosion engine mounted upon said casting and connected with said crank shaft, and an air compressor mounted upon said casting and driven from said crank shaft.

29. In construction of the class described, in combination, a pair of side bars, a casting stretched between and bracing said side bars, a crank shaft mounted upon said casting, an internal explosion engine mounted upon said casting and connected with said crank shaft, a shaft connected with the valve gearing of said engine, a substantially vertical shaft mounted upon said casting, power transmitting means connecting said last-mentioned shaft with said crank shaft, power transmitting means connecting the same with said valve gearing shaft, and an air compressor mounted upon said casting and driven from said crank shaft.

30. In construction of the class described, in combination, a pair of truck side bars, a casting stretched between and bracing said side bars, a crank shaft mounted upon said casting, an internal explosion engine mounted upon said casting and connected with said crank shaft, a shaft connected with the valve gearing of said engine, a substantially vertical shaft mounted upon said casting, power transmitting means connecting said last-mentioned shaft with said crank shaft, power transmitting means connecting the same with said valve gearing shaft, and power transmitting means connected with said crank shaft and adapted to propel the truck.

31. In apparatus of the class described, in combination, a pair of truck side bars, a casting bridged across said side bars and secured thereto, said casting being substantially closed at the bottom and provided with an opening for a power transmitting chain intermediate its ends, an engine mounted on said casting, and means adapted to drive the truck from said engine.

32. In apparatus of the class described, in combination, a pair of truck side bars, a casting bridged across said side bars and secured thereto, said casting being substantially closed at the bottom and provided with an opening for a power transmitting chain intermediate its ends, bearings within said casting, an engine mounted upon said casting and having its crank shaft journaled within said bearings, and a power transmitting chain leading from said engine through said opening and adapted to drive the truck from said engine.

33. In apparatus of the class described, in combination, a pair of truck side bars, engine supporting means connecting said side bars and secured thereto, said supporting means being substantially closed at the bottom and provided with an opening for a power transmitting chain and with upright openings or sleeves for engine supports, bearings within said supporting means, an engine mounted upon said supporting means, and a power transmitting chain extending through said first opening in said supporting means and adapted to drive the truck from said engine.

34. In apparatus of the class described, in combination, a pair of truck side bars, engine supporting means connecting said side bars and secured thereto, said engine supporting means being substantially closed at the bottom and provided with an opening for a power transmitting chain intermediate its ends and with a stiffening web or flange extending longitudinally along its bottom, bearings in said supporting means, an engine mounted upon said supporting means and having its crank shaft journaled within said bearings, and a power transmitting chain extending through said opening and adapted to drive the truck from said engine.

35. In apparatus of the class described, in combination, a pair of truck side bars, a casting bridged across said side bars and secured thereto, said casting being substantially closed at the bottom and provided with an opening for a power transmitting chain intermediate its ends and with a stiffening web or flange along its underside and with upright openings or sleeves for engine supports, bearings in said casting, an engine mounted upon said casting and having its crank shaft journaled within said bearings, and a power transmitting chain leading from said engine and adapted to drive the truck.

36. In apparatus of the class described, in combination, a pair of truck side bars, a casting bridged across and fitted between said side bars and secured thereto, said casting being of a generally upwardly curved form and having bearing supports integral therewith and provided with openings for engine supports and for a power transmitting chain, an engine mounted upon said casting transversely of the truck, and a power transmitting chain leading from said engine through said casting and adapted to drive the truck.

37. In apparatus of the class described, in combination, a pair of truck side bars, an engine support or bed bridged across said side bars and secured thereto, comprising a pair of substantially upright portions, bearing supports extending between said upright portions of said engine support, a multiple cylinder engine mounted upon said support extending transversely of the truck, and means adapted to drive the truck from said engine.

38. In apparatus of the class described, in combination, a pair of truck side bars, an engine support or bed bridged across said side bars and comprising a pair of substantially upright flanged portions, means extending between the same at the bottom thereof, bearing supports within said bed extending between said upright portions, and a multiple cylinder engine mounted upon said support extending transversely of the truck.

39. In truck construction, in combination, a pair of flanged side bars provided with parts extending over the axles of the truck, a bolster adapted to mount a car body upon the truck, guiding means for said bolster, an engine support extending from one to the other of said side bars and connected therewith, shaft bearings in said support, an engine mounted upon said support and having its shaft journaled in said bearings, and means adapted to drive the truck from said engine.

40. In truck construction, in combination, a pair of flanged side bars provided with parts extending over the axles of the truck, a bolster adapted to mount a car body upon the truck, guiding means for said bolster, an engine support extending from one to the other of said side bars and connected therewith, shaft bearings in said support, an engine mounted upon said support and having its shaft journaled in said bearings, and means adapted to drive the truck from said engine, said engine support being removably secured to said side bars.

41. In truck construction, in combination, a pair of flanged side bars, pedestal portions at the ends of each of said side bars adapted to extend over the axles of the truck, one of said pedestal portions having an upper longitudinally projecting portion connected by a brace with the lower portion thereof, a bolster adapted to mount a car body upon the truck, guiding means for said bolster, an engine support extending from one to the other of said side bars and connected therewith, shaft bearings in said support, an engine mounted upon said support and having its crank shaft journaled in said bearings, and means adapted to drive the truck from said engine.

In testimony whereof I affix my signature, in the presence of two witnesses.

WILLIAM R. McKEEN, Jr.

Witnesses:
  CHAS. L. DUNDEY,
  E. M. BARTLETT.